(12) United States Patent
Ramsauer

(10) Patent No.: US 11,867,209 B2
(45) Date of Patent: Jan. 9, 2024

(54) SLIDING BLOCK

(71) Applicant: Dieter Ramsauer, Schwelm (DE)

(72) Inventor: Dieter Ramsauer, Schwelm (DE)

(73) Assignee: Dieter Ramsauer, Schwelm (DE)

( * ) Notice: Subject to any disclaimer, the term of this patent is extended or adjusted under 35 U.S.C. 154(b) by 860 days.

(21) Appl. No.: 16/959,795

(22) PCT Filed: Jun. 12, 2018

(86) PCT No.: PCT/DE2018/100558
§ 371 (c)(1),
(2) Date: Jul. 2, 2020

(87) PCT Pub. No.: WO2019/137571
PCT Pub. Date: Jul. 18, 2019

(65) Prior Publication Data
US 2020/0362897 A1    Nov. 19, 2020

(30) Foreign Application Priority Data

Jan. 9, 2018 (DE) ..................... 20 2018 100 079.9

(51) Int. Cl.
*F16B 12/10* (2006.01)
*F16B 2/10* (2006.01)

(52) U.S. Cl.
CPC ..................................... *F16B 2/10* (2013.01)

(58) Field of Classification Search
CPC ...... F16B 2200/10; F16B 21/02; F16B 12/10; F16B 2012/103; E05C 3/04; E05C 3/041; E05C 3/042; E05B 17/025; E05B 63/0013; E05B 63/127
See application file for complete search history.

(56) References Cited

U.S. PATENT DOCUMENTS 2,255,402 A * 9/1941 Vile ..................... E05B 63/0013
                                                            70/380
3,362,672 A * 1/1968 Wigam ................... E05C 3/042
                                                            411/549

(Continued)

FOREIGN PATENT DOCUMENTS

CN      203515052         4/2014
DE      29617944 U1 *     6/1998     ........... E05B 13/002

(Continued)

OTHER PUBLICATIONS

Notification of Transmittal of Translation of the International Preliminary Report on Patentability for application No. PCT/DE2018/100558 dated Jul. 23, 2020.

(Continued)

*Primary Examiner* — Jonathan P Masinick
(74) *Attorney, Agent, or Firm* — Eugene LeDonne; Haug Partners

(57) ABSTRACT

One-piece sliding block consisting of plastic, in particular for locking tongues of fittings, comprising a base portion, wall portions and a cover portion, wherein the cover portion overlaps a subregion of the base portion so as to form an insert opening for a component that can be operatively connected to the cover portion, and wherein latching means which are moulded onto the cover portion are provided in the region of the sliding block.

18 Claims, 10 Drawing Sheets

(56) References Cited

U.S. PATENT DOCUMENTS

| | | | | |
|---|---|---|---|---|
| 3,402,958 | A * | 9/1968 | Barry | E05C 3/042 292/62 |
| 5,435,159 | A * | 7/1995 | Ramsauer | E05B 9/084 70/451 |
| 6,361,088 | B1 * | 3/2002 | Ramsauer | E05B 9/08 292/DIG. 60 |
| 8,122,745 | B2 * | 2/2012 | Ramsauer | E05B 9/08 292/336.3 |
| 8,459,703 | B2 * | 6/2013 | Anderson | E05B 63/0056 292/63 |
| 9,605,454 | B2 * | 3/2017 | Ramsauer | E05B 57/00 |
| 10,502,432 | B2 * | 12/2019 | Zhou | A61L 2/26 |
| 11,193,313 | B2 * | 12/2021 | Olkay | E05C 3/042 |
| 2009/0315309 | A1 * | 12/2009 | Lopes | B60D 1/60 280/762 |
| 2009/0315342 | A1 * | 12/2009 | Dalton, Jr. | E05C 3/042 292/197 |
| 2011/0012373 | A1 * | 1/2011 | Ramsauer | E05C 9/043 292/138 |

FOREIGN PATENT DOCUMENTS

| | | | | |
|---|---|---|---|---|
| DE | 20 2011 105 345 | | 1/2013 | |
| DE | 202013104438 U1 | * | 11/2013 | E05B 17/002 |
| DE | 20 2013 004 046 | | 9/2014 | |
| DE | 202013010024 U1 | * | 3/2015 | E05B 17/002 |
| DE | 20 2014 009 753 | | 4/2016 | |
| DE | 20 2016 003 588 | | 10/2017 | |
| DE | 20 2016 005 817 | | 2/2018 | |
| DE | 20 2016 005 818 | | 2/2018 | |
| DE | 202016005817 | | 2/2018 | |
| DE | 202016005818 | | 2/2018 | |
| DE | 202020101412 U1 | * | 5/2020 | E05B 17/0025 |
| EP | 0635612 A1 | * | 1/1995 | |
| EP | 2 138 655 | | 12/2009 | |
| EP | 2138655 | | 12/2009 | |
| WO | WO-2021180880 A1 | * | 9/2021 | E05C 3/042 |

OTHER PUBLICATIONS

Search Report for Application No. PCT/DE2015/100558 dated Sep. 11, 2018.

Notification of first office action for Chinese Application No. 201880079210.2 dated Feb. 24, 2021.

* cited by examiner

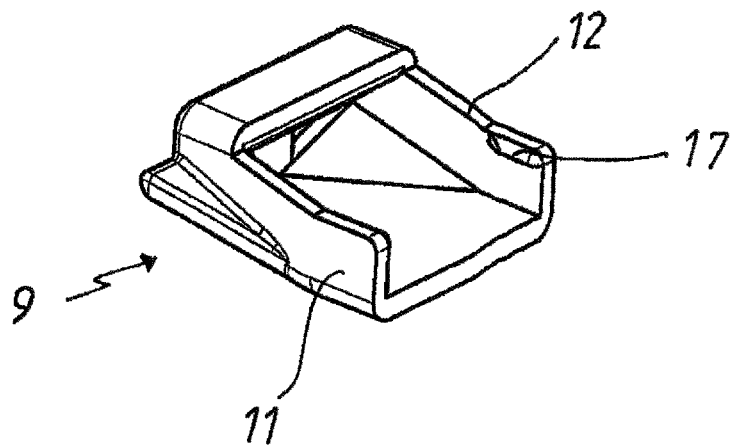
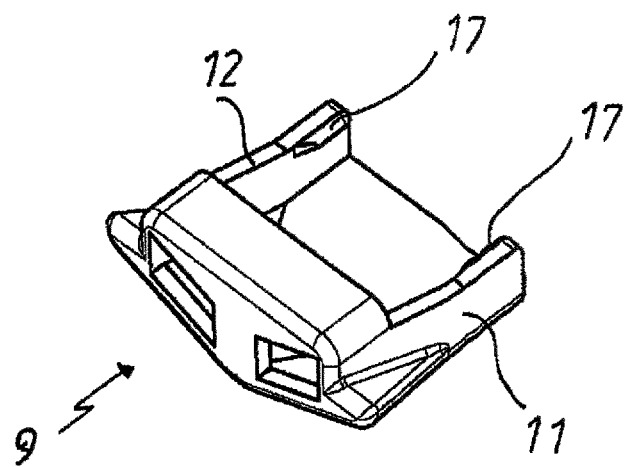
Fig. 7
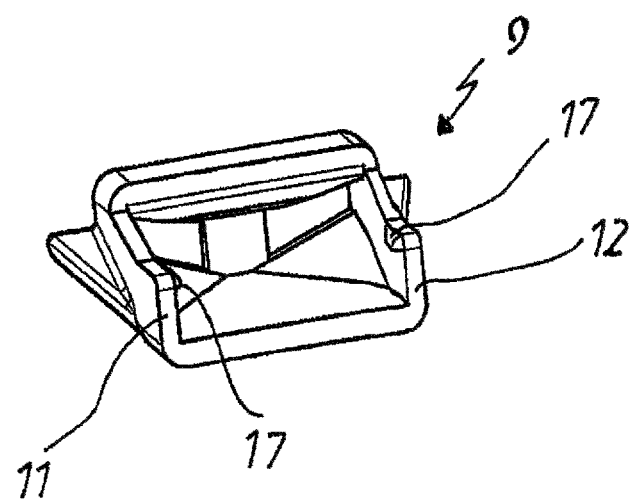

SLIDING BLOCK

The present application claims priority from PCT Patent Application No. PCT/DE2018/100558 filed on Jun. 12, 2018, which claims priority from German Priority Application No. DE 20 2018 100 079.9 filed on Jan. 9, 2018, the disclosures of which are incorporated herein by reference in their entirety.

FIELD OF THE INVENTION

The invention relates to a sliding block, in particular for locking tongues of fittings.

DE 20 2016 003 588 U1 discloses a closure system comprising an electromechanical closure, in particular a swivel lever, rotary bolt or compression lock, the lock of which can be opened by a current signal flowing through a magnetic coil or motor. A fitting provided with a locking tongue is used for opening and closing.

Further closures which are operatively connected to tongues can be found in the publications DE 20 2014 009 753 U1, DE 20 2013 004 046 U1 and DE 20 2011 104 345 U1.

Such closure means are often installed in housings or cabinets, for example industrial housings or control cabinets, wherein the locking tongue in the closed state engages behind a counter-surface of a cabinet or housing element, for example.

As can be seen from the prior art, such a fitting can have a wide variety of geometric contours and locking tongues.

It is generally known that the tongue area is either covered with a plastic coating or multi-piece plug-in elements are positioned there.

Plastic coating has the disadvantage that it is rubbed off when the cabinet or housing is constantly opened and closed, and thus loses its noise-damping slidability function.

Multi-piece plug-in elements are considered problematic with regard to the handling of their mounting. The store-keeping is also increased. Furthermore, mounting problems can occur since two-piece plug-in elements are mounted in a twisted position.

SUMMARY OF THE INVENTION

The invention is based on the object of providing a sliding block, in particular for locking tongues of fittings, which no longer includes the disadvantages indicated above.

In addition, it is intended to provide a component, in particular a fitting provided with a locking tongue, the closing process of which is considerably improved by improvement of the sliding properties between the rear engagement surface of the frame and the locking tongue.

Finally, it is also intended to propose a housing or a cabinet, which can be equipped with fittings according to the innovation and whose coated rear engagement surface of the frame is not damaged during the closing process.

The object is achieved by a one-piece sliding block consisting of plastic, in particular for locking tongues of fittings, comprising a base portion, wall portions and a cover portion, wherein the cover portion overlaps a subregion of the base portion so as to form an insert opening for a component that can be operatively connected to the cover portion, and wherein latching means which are moulded onto the cover portion are provided in the region of the sliding block.

Advantageous further embodiments of the sliding block according to the invention can be found in the associated subclaims.

The object is also achieved by a component, in particular a fitting provided with a locking tongue, wherein a sliding block according to any of claims 1 to 14 can be releasably attached to the locking tongue.

Advantageous further embodiments of the component according to the invention can be found in the associated subclaims.

The object is also achieved by a housing or a cabinet, in particular an industrial housing or control cabinet, comprising a component, in particular a fitting according to any of claims 15 to 17.

The sliding block thus contains a rigid portion which receives the free end of the locking tongue and a resiliently designed portion which elastically encompasses parts of the locking tongue.

As a result of the latching means provided on the sliding block side, the locking tongue is releasably locked relative to the sliding block after it has been mounted.

The sliding block is thus captively connected to the locking tongue of the fitting, but can later be easily removed from the sliding tongue for recycling purposes.

Depending on the configuration of the locking tongue, the base portion of the sliding block can have a rectangular or square base area, the cover portion only overlapping this base area by a certain extent, for example 10 to 50% of the length of the base area.

According to a further concept of the invention, the sliding block can be made from a thermoplastic.

Polyamide, e.g. PA6, for example, is suitable here, the material being provided with a predeterminable proportion of glass fibres.

If higher sliding properties or harsher environmental conditions exist, polyoxymethylene (POM) can alternatively be used as the material, since this material is characterised by particularly favourable and low friction values.

The sliding block itself is advantageously produced as an injection-moulded part.

In the region of the associated end face of the base portion, the sliding block has, according to a further concept of the invention, a web which extends between the cover portion and the base portion. In the mounted state, this web can be used as a stop for the free end of the locking tongue of the fitting.

As shown in the prior art, locking tongues of fittings can be designed with different contours. The respective sliding block used is adapted thereto such that it is provided with corresponding profiles in the region of its base portion and/or cover portion.

According to a further concept of the invention, the latching means are provided in the region of the cover portion and extend, forming a bead, an undercut or the like, in the direction of the base portion. In the mounted state, the latching means engage behind counter-profiles provided on the locking tongue.

Alternatively, it is also possible to provide the latching means in the region of the lateral wall portions. The latching means, which are directed towards one another and for example may be, in the form of a bead, overlap partial regions of the locking tongue when the fitting is in the mounted state.

The region of the base portion which is not overlapped by the cover portion can be resiliently designed, forming slots, with guide elements for the component or the locking tongue being arranged in the resilient portion.

It can also be advantageous to make the sliding block wider. This measure almost doubles the approach slope, which considerably improves the closing process.

In the mounted state, the guide elements interact with lateral wall regions of the locking tongue.

A component, in particular a fitting, which cooperates with a housing or cabinet, in particular an industrial housing or a control cabinet, and which contains a sliding block, not only protects the locking tongue, but also has a noise-damping function.

Compared to the prior art, in particular two-piece plug-in elements, the following advantages are obtained:

simplified mounting of the sliding block on the locking tongue and thus cost reduction for the customer;

low manufacturing costs and thus competitive advantage;

low tool costs, since one is no longer required;

low storage costs and simplification of packaging;

avoidance of errors by the customer, because second plug-in part can be mounted in the wrong position;

one-piece sliding block, no mounting errors possible.

BRIEF DESCRIPTION OF THE DRAWINGS

The subject matter of the invention is illustrated using an exemplary embodiment in the drawings and is described as follows.

FIG. 7 shows the sliding block according to FIG. 6 in different spatial views;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
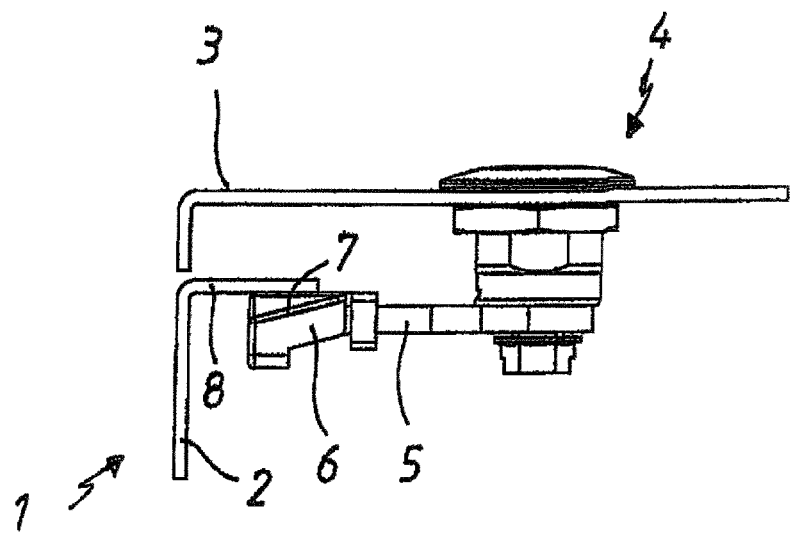
FIG. 1 shows a schematic diagram of a control cabinet, which is only indicated and is provided with a closure, in different positions.
Figure 1:
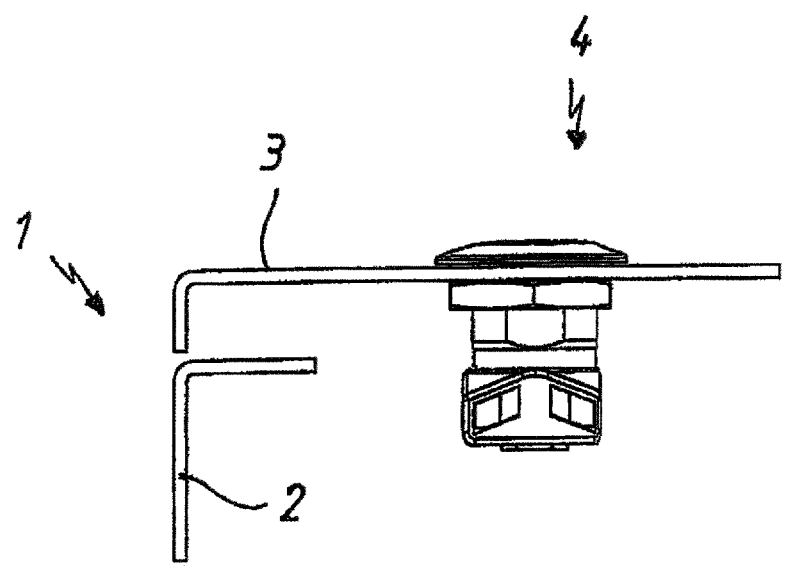

FIG. 1 shows a control cabinet 1 in an indicated form, although any cabinet or even a housing can be addressed instead of this control cabinet. The control cabinet 1 contains a housing body 2 and a door 3. The door 3 can be opened or closed via a suitable closure system 4.

The top image in FIG. 1 shows the closed state of the door 3, while the bottom image in FIG. 1 represents the opened state.

A fitting 5 interacts with the closure system 4 and terminates in a locking tongue 6 in its free end region. As will be described in more detail later, the locking tongue 6 has a profiled portion 7 which, forming an approach slope, engages behind a wall portion 8 of the housing body 2. In this example, the fitting 5 is designed as an elongated body, although contours depicted in the prior art are also conceivable.

Figure 2A:
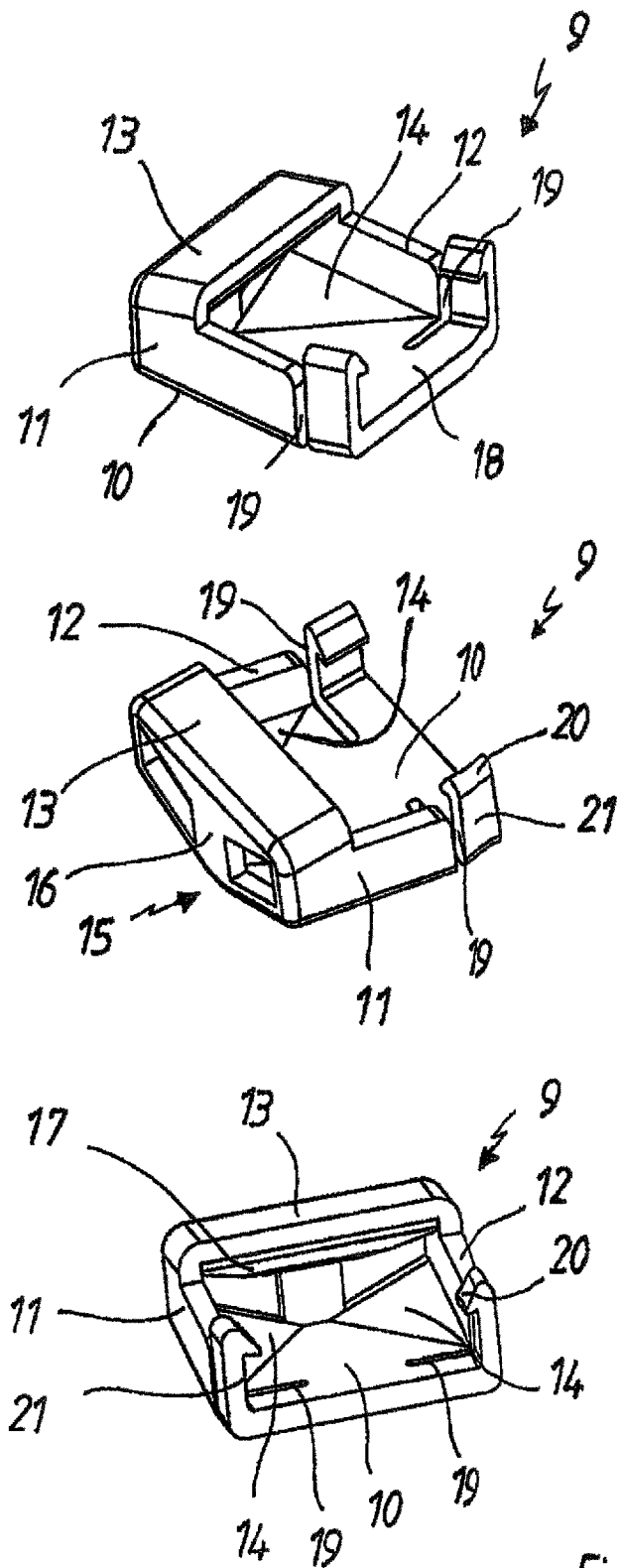
FIGS. 2a to 2c show a sliding block according to the invention in different views or sections, respectively.
Figure 2B:
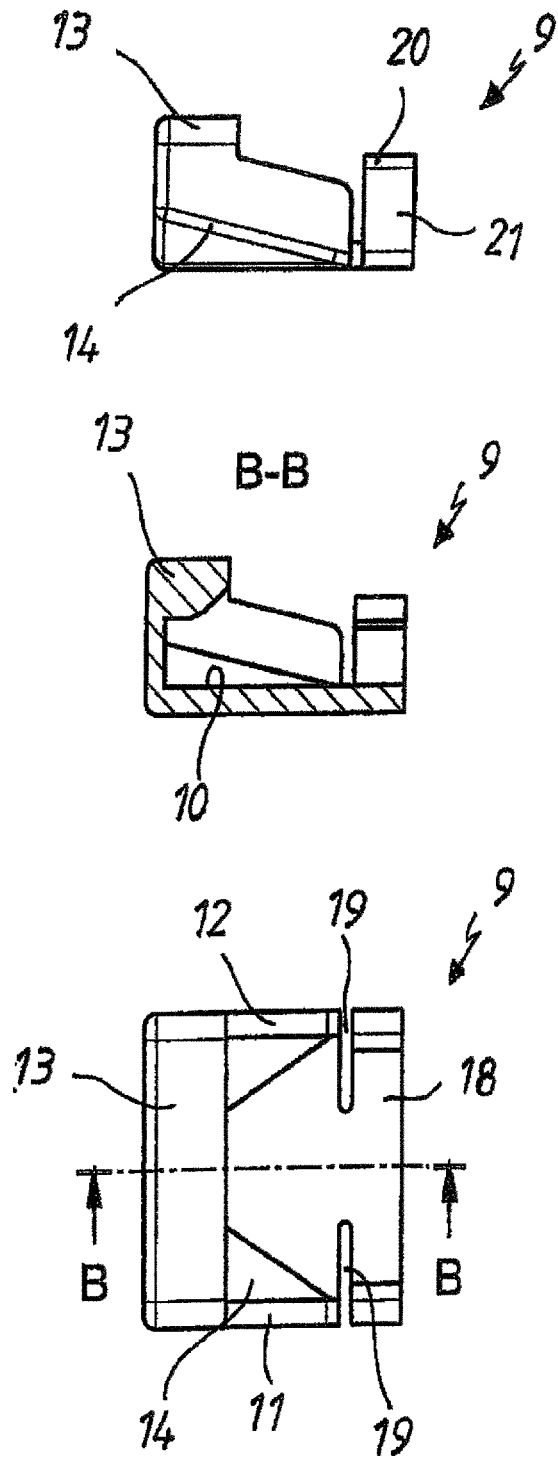
Figure 2C:
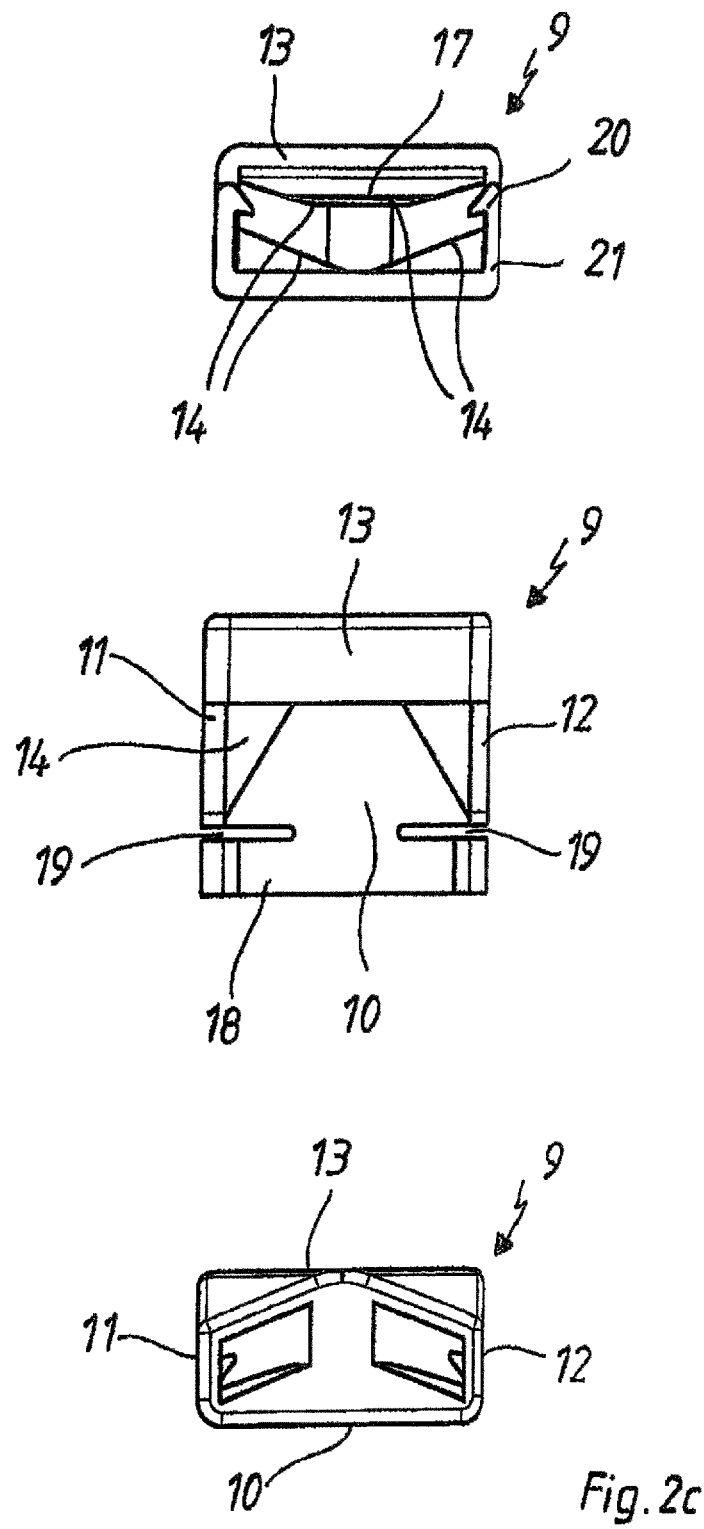

FIGS. 2a to 2c show different illustrations or sections, respectively, of the sliding block 9 according to the invention. The sliding block 9, which is designed as an injection-moulded part, consists of POM. The sliding block 9 is formed in one piece and has the following elements:

a base portion 10, lateral wall portions 11, 12 and a cover portion 13. Depending on the configuration of the locking tongue 6 shown in FIG. 1, the base portion 10 and/or the cover portion 13 is provided with suitable profiled regions 14. In the region of the end face 15 of the base portion 10, which contains the cover portion 13, a web 16, which is moulded on by injection moulding, extends between the cover portion 13 and the base portion 10, which web can serve as a stop for the mounted locking tongue 6. On the cover portion side, in this example, bead-shaped latching means 17 are provided, which extend in the direction of the base portion 10. The shape and configuration of these latching means 17 can be of any type and are adapted by the person skilled in the art to the respective profile shape of the locking tongue 6. The sliding block 9 according to the invention has a resiliently designed guide region 18 outside the cover portion 13, wherein the spring effect is produced by slots 19 made in the base portion 10 and in the wall portions 11, 12. In the resiliently designed guide region 18, guide elements 21 provided with profiles 20 are moulded on, which in the mounted state can be operatively connected to corresponding wall portions of the locking tongue 6.

Figure 3:
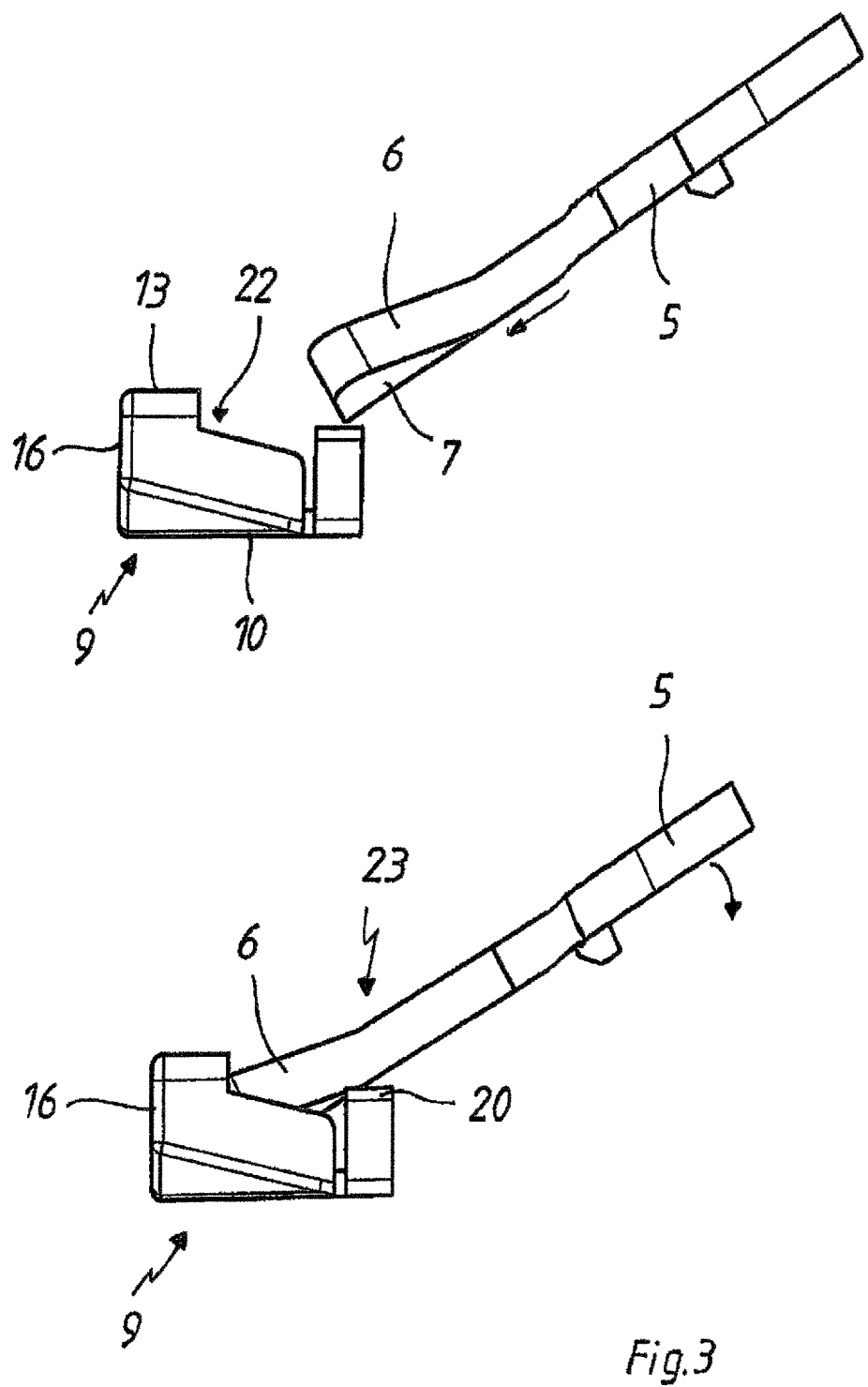
FIG. 3 shows a schematic diagram of the process of mounting a sliding block on a locking tongue.

FIG. 3 shows a mounting step, which is only indicated, of a fitting 5 shown in FIG. 1. The locking tongue 6, which is provided with a profiled portion (approach profile) 7, and the sliding block 9 described and illustrated in the previous figures, can be seen. The locking tongue 6 of the fitting 5 is inserted at a predeterminable angle into the insert opening 22 of the sliding block 9 formed between the base portion 10 and the cover portion 13, the fitting 5 or the locking tongue 6, respectively, being positioned relative to the sliding block 9. After the locking tongue 6 has been introduced into the insert opening 22, namely up to the web 16 forming a stop, the fitting 5 can then be moved in the direction of the arrow, so that the resiliently designed guide elements 20 of the resiliently designed guide region 18 can be operatively connected to corresponding wall portions 23 of the locking tongue 6.

Figure 4:
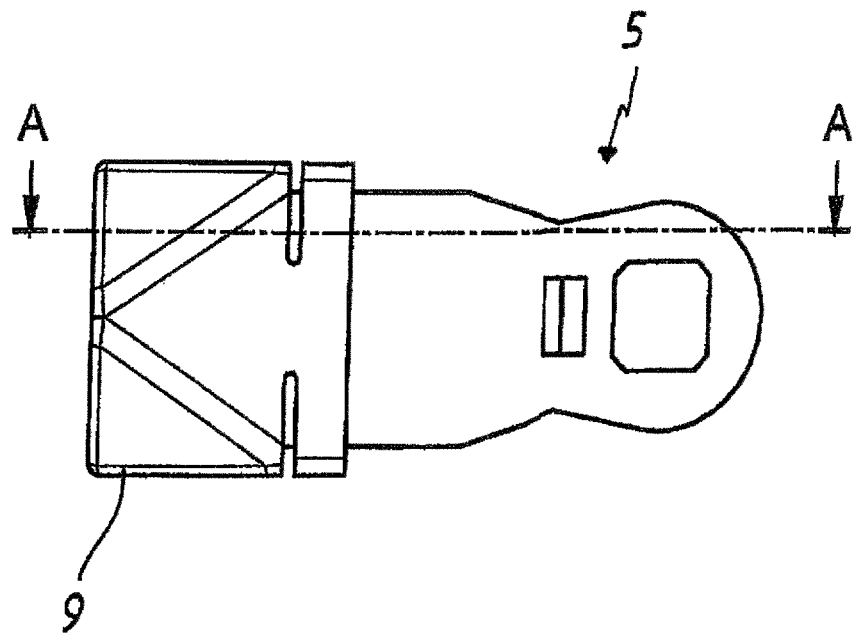
FIG. 4 shows the mounted state of the sliding block on the locking tongue in different views or sections, respectively.
Figure 4:
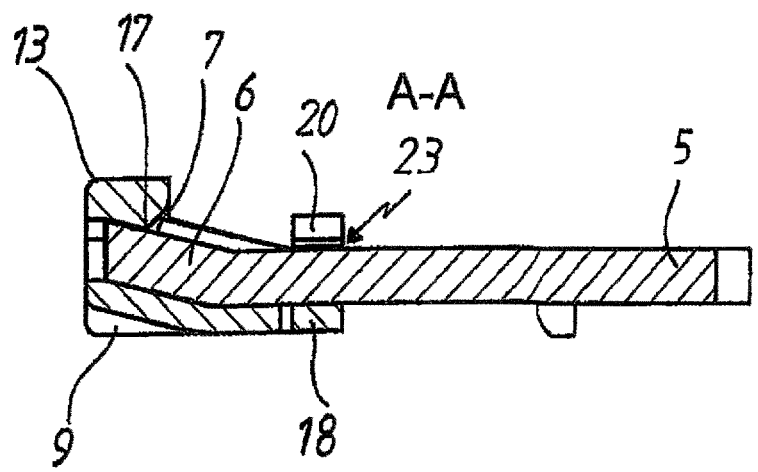

FIG. 4 shows the mounted state of the fitting 5 in different views or sections, respectively. In addition to the sliding block 9, the locking tongue 6 can also be seen. The latching means 17 formed by a bead or an undercut in the region of the cover portion 13 engages behind the profile 7 of the locking tongue 6, so that in this state a releasable connection between the locking tongue 6 and the sliding block 9 is established. The resiliently designed guide region 18, or the guide elements 20, 21, respectively, rest in the mounted state on the wall portions 23 of the locking tongue 6 already mentioned.

FIGS. 5 to 8 illustrate an alternative configuration of the sliding block 9 shown in the previous figures, meaning that the same reference signs apply to the same components.

Figure 5:
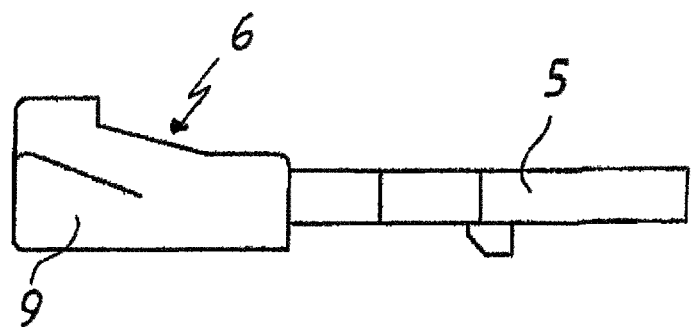
FIG. 5 shows the mounted state of the sliding block on the locking tongue in different views or sections, respectively, as an alternative to FIG. 4.
Figure 5:
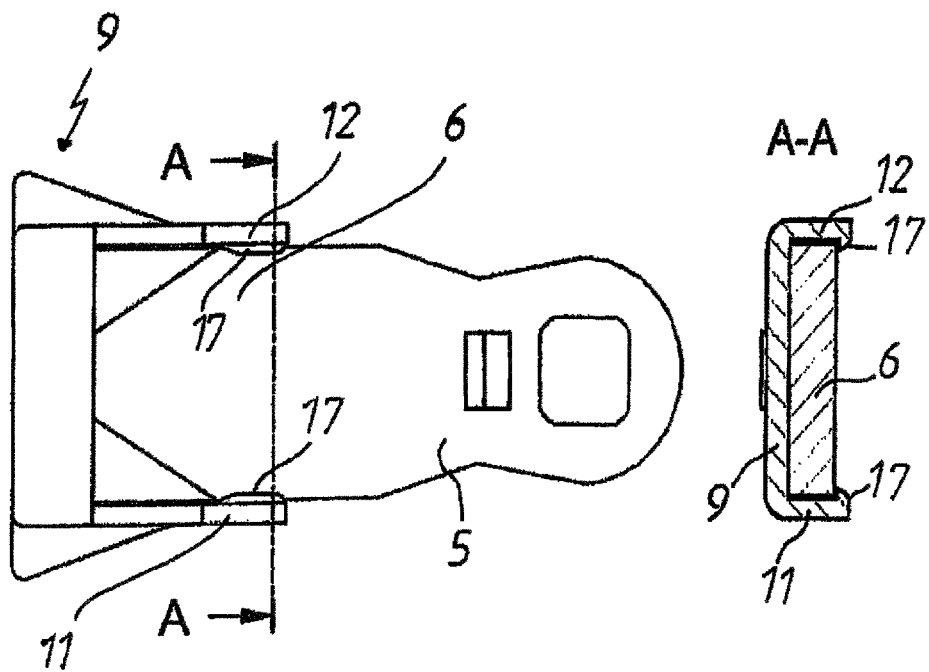

FIG. 5 shows the mounted state of the alternative sliding block 9 on a locking tongue 6 in different views or sections, respectively. As already mentioned, the locking tongue 6 is part of a fitting 5.

The latching means 17 are also formed by a bead here, but in contrast to the previous figures, they are not provided in the region of the cover portion but in the region of the lateral wall portions 11, 12.

Figure 6:
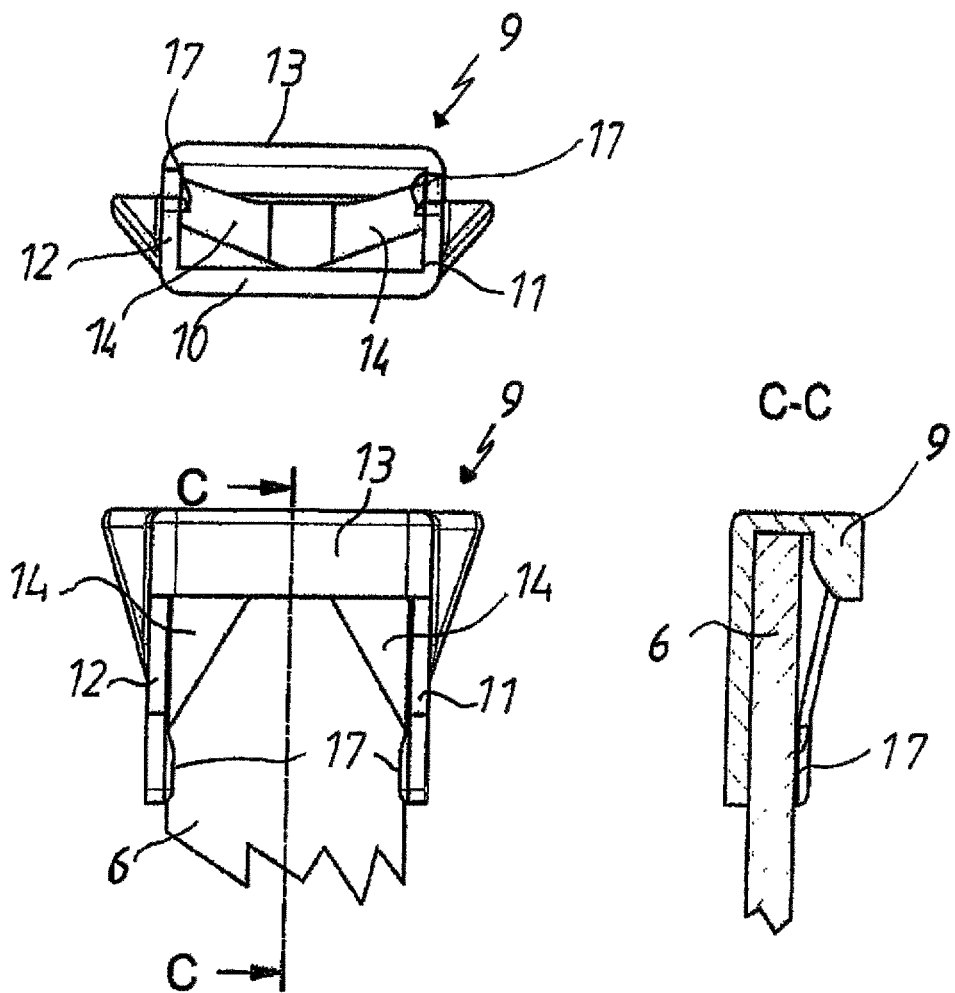
FIG. 6 shows the sliding block according to the invention as an alternative to FIGS. 2a-2c.
Figure 6:
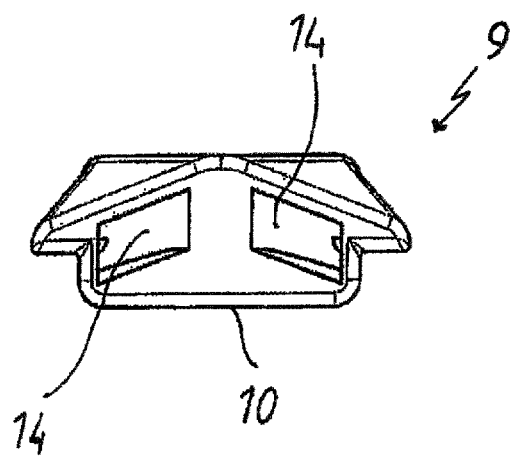

FIG. 6 shows the alternative configuration of the sliding block 9 according to the invention as an alternative to FIGS. 2a to 2c. The following elements can be seen:

the base portion 10, lateral wall portions 11, 12 and the cover portion 13. Depending on the configuration of the locking tongue 6 shown in FIG. 5, the base portion 10 and/or the cover portion 13 is provided with suitable profiled regions 14. The latching means 17 provided on the lateral wall portions 11, 12 overlap the locking tongue 6 in the mounted state.

FIG. 7 shows the sliding block 9 according to FIG. 6 in different spatial views. The latching means 17 provided on the lateral wall portions 11, 12 can be seen.

FIGS. 5 to 7 show a widened version of the sliding block 9 compared to the previous figures. This has the advantage that the approach slope is almost doubled, which considerably improves the closing process, in particular if a seal is to be pressed in.

Figure 8:
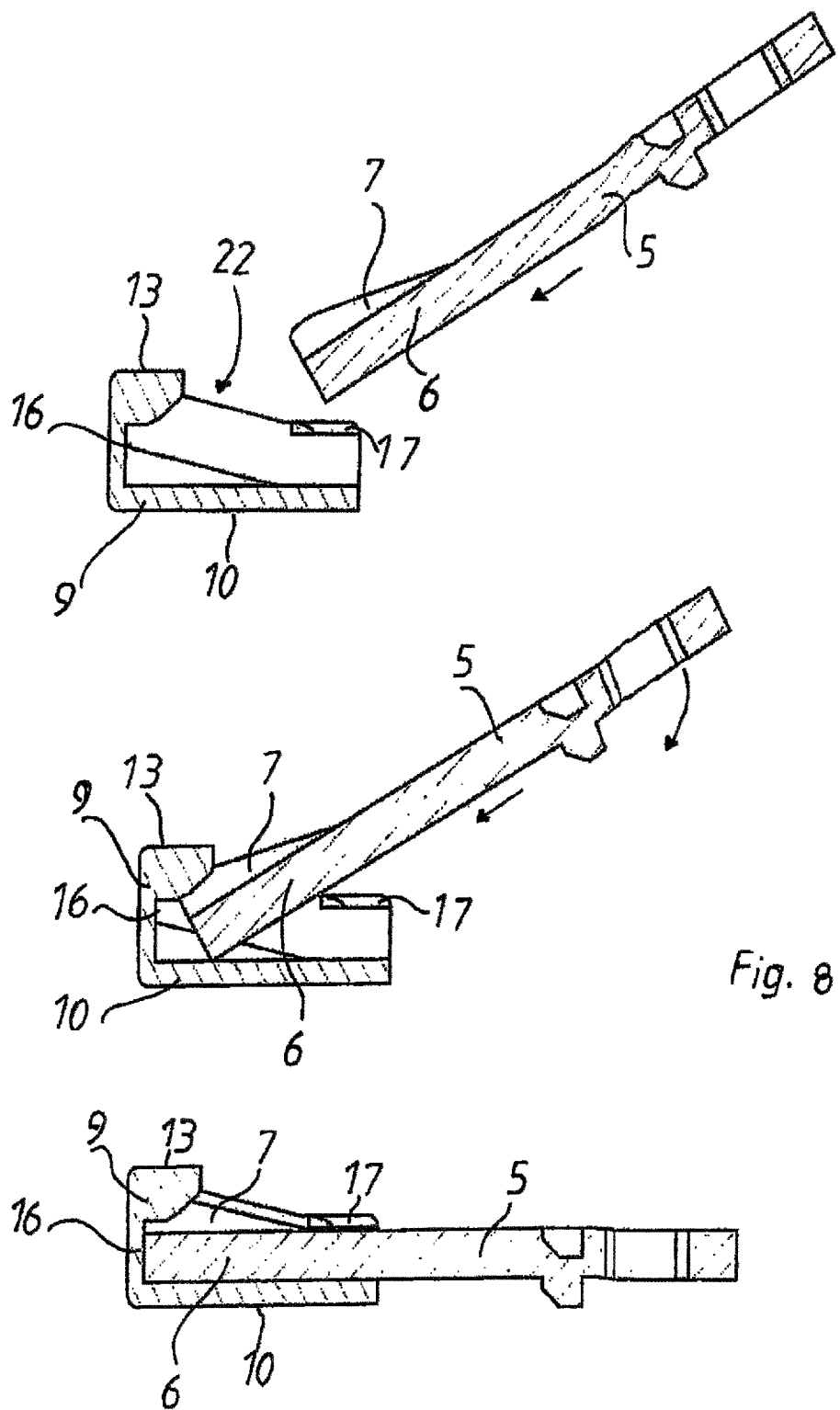
FIG. 8 shows a schematic diagram of the mounting process of the sliding block according to FIG. 6 or 7, respectively.

FIG. 8 shows a schematic diagram of the mounting process of the sliding block 9 according to FIGS. 6 and 7. The locking tongue 6, which is provided with a profiled portion (approach profile) 7 and which is part of a fitting 5, can be seen. The locking tongue 6 of the fitting 5 is inserted at a predeterminable angle into the insert opening 22 of the sliding block 9 formed between the base portion 10 and the cover portion 13, the fitting 5, or the locking tongue 6, respectively, being positioned relative to the sliding block 9. After the locking tongue 6 has been introduced into the insert opening 22, namely up to the web 16 forming a stop, the fitting 5 can then be moved in the direction of the arrow After the locking tongue 6 has been inserted into the sliding block 9, the latching means 17 overlap the locking tongue 6.

LIST OF REFERENCE SIGNS 1 control cabinet
2 housing body
3 door
4 closure system
5 fitting
6 locking tongue
7 profiled portion (approach profile)
8 wall portion
9 sliding block
10 base portion
11 wall portion
12 wall portion
13 cover portion
14 profiled region
15 end face
16 web
17 latching means
18 guide region (resilient)
19 slot
20 profile
21 guide element
22 insert opening
23 wall portion sliding tongue

The invention claimed is:

1. A one-piece sliding block consisting of plastic, in particular for locking tongues of fittings, comprising a base portion, wall portions and a cover portion, wherein the cover portion overlaps a subregion of the base portion, so as to form an insert opening for a component that can be operatively connected to the cover portion, and wherein latching means which are moulded onto the cover portion are provided in a region of the sliding block.

2. The sliding block according to claim 1, wherein the base portion has a rectangular or square base area and the cover portion overlaps this base area by 10 to 50% of the length of the base area.

3. The sliding block according to claim 1, wherein the cover portion, in a region of an associated end face of the base portion, has at least one web which is operatively connected thereto.

4. The sliding block according to claim 1, wherein the base portion and/or the cover portion is provided with profiled regions.

5. The sliding block according to claim 1, wherein profiled region, at least of the base portion, are adapted to a counter-contour of the fitting.

6. The sliding block according to claim 1, wherein the latching means is or are provided in a region of the cover portion and extends, forming a bead or undercut, in a direction of the base portion.

7. The sliding block according to claim 1, wherein the latching means is or are provided in a region of the lateral wall portions.

8. The sliding block according to claim 1, wherein a region of the base portion which is not overlapped by the cover portion is provided with guide elements for the fitting.

9. The sliding block according to claim 8, wherein, in a region of a free end face of the base portion provided outside the cover portion, a resilient guide region receiving the guide elements is provided.

10. The sliding block according to claim 9, wherein the resiliently designed guide region is formed by slots made in the base portion.

11. The sliding block according to claim 1, wherein the sliding block consists of a thermoplastic plastic.

12. The sliding block according to claim 11, wherein the sliding block consists of polyoxymethylene (POM).

13. The sliding siding block according to claim 11, wherein the sliding block consists of polyamide, in particular of a polyamide provided with a predeterminable glass fibre content.

14. The sliding siding block according to claim 1, wherein the sliding block is designed as an injection-moulded part.

15. A component, in particular a fitting provided with a locking tongue, wherein a sliding block according to claim 1 is releasably attached to the locking tongue.

16. The component according to claim 15, wherein the locking tongue is provided in a region of a free end with a predeterminable profiled portion, wherein the sliding block is provided with a corresponding counter-profile and wherein the releasable connection between the sliding block and the locking tongue can be brought about by latching means provided on the sliding block.

17. The component according to claim 15, wherein guide elements moulded onto the sliding block can be operatively connected to lateral wall regions of the locking tongue.

18. A housing or cabinet, in particular industrial housing or control cabinet, comprising a component, in particular a fitting, according to claim 15.

\* \* \* \* \*